Patented Aug. 30, 1927.

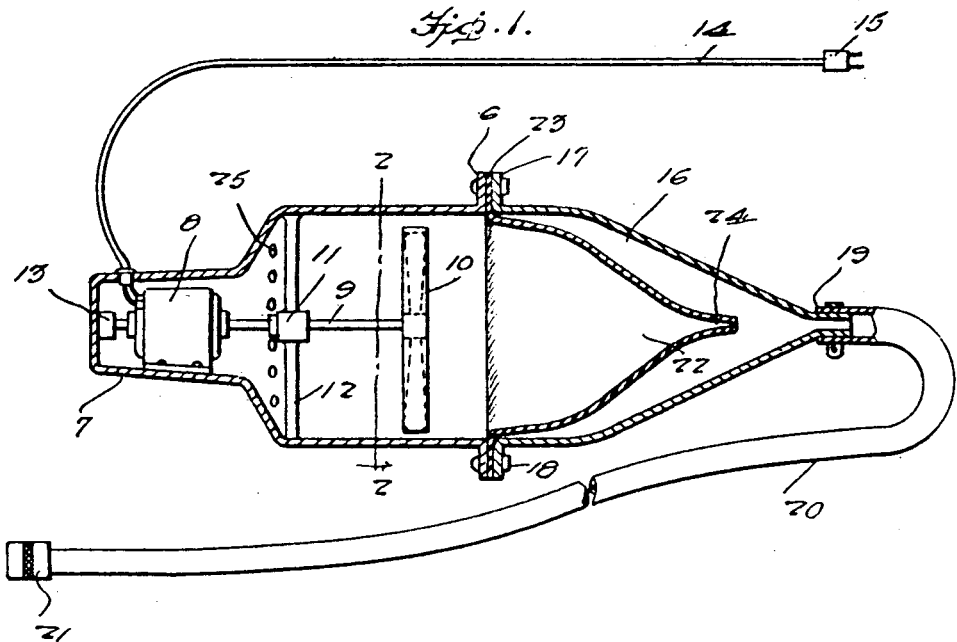
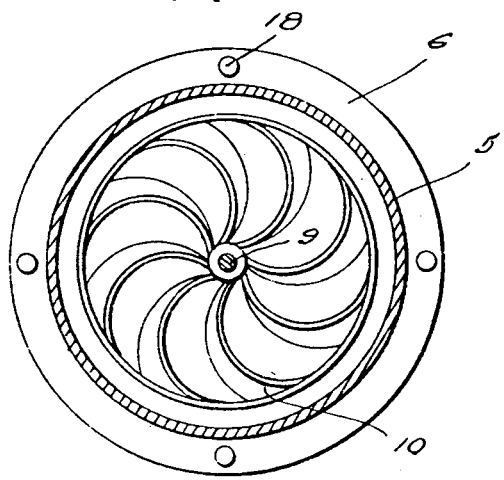

1,640,880

UNITED STATES PATENT OFFICE.

ROBERT C. BUSHNELL, OF PHILADELPHIA, PENNSYLVANIA.

TIRE PUMP.

Application filed February 3, 1927. Serial No. 165,592.

This invention relates to new and useful improvements in pumping devices, particularly adapted for use in the inflation of tires and one that may be readily mounted upon an automobile or within a tire repair or service station.

An important object of the invention is to provide a tire pump that is extremely simple of construction and inexpensive of manufacture, the same including generally a blower fan casing having an air exhaust upon which is arranged an air hose having means upon its end for attachment with the usual inflation valve of tires, said blower fan being connected to a small power electric motor that may be readily electrically connected with the storage battery of the automobile or with the house current of the garage, service station, and the like.

The invention further aims to provide a pump of this general character that is equipped with extremely simple and inexpensive means for preventing return flow of the air into the fan chamber, but yet to permit the proper flow of the air from said chamber.

With the foregoing and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the several views:

Figure 1 is a detail longitudinal section through my improved tire pump, and

Figure 2 is a transverse section taken substantially upon the line 2—2 of Figure 1 and looking rearwardly in the direction of the arrows.

Now having particular reference to the drawing, 5 indicates a cylindrical air chamber of metal or other suitable material, open at one end and circumferentially flanged at this end as at 6. The opposite end of the chamber is formed with a reduced extension 7 within which is rigidly mounted small power electric motor 8 having an elongated armature shaft 9 that extends into the chamber 5 and upon the inner end of which is mounted a suitable type of blower fan 10. This shaft 9 is journaled within a bearing 11 formed at the center of a spider 12 rigidly secured to the interior of the chamber 5. The opposite end of the armature shaft is suitably journaled within a bearing 13 arranged upon the back wall of the chamber extension 7. Leading from this motor 8 is a cable 14 having means upon its end designated 15 to facilitate the attachment of the same to a source of electric supply.

The invention further consists of a generally conical shaped head 16 circumferentially flanged at its inner larger end as at 17 so as to facilitate the attachment of the head to the chamber 5 through the medium of bolt and nut connections 18 passing through the flanges 6 and 17 of the chamber head respectively.

The forward end of the head 16 is provided with a circular exhaust nipple 19 over which is rigidly secured one end of a flexible hose 20 upon the opposite end of which is a suitable coupling unit 21 to facilitate the attachment of this hose to a pneumatic tire valve stem of conventional design.

Arranged within the head 16 is a funnel shaped body 22 of rubber or other suitable material that is formed at its enlarged end with a laterally directed circumferential rim 23 for disposition between the flanges 6 and 17 of the chamber 5 and head 16 so as to permit of the rigid and air tight securing of the rubber body within said head. As clearly disclosed in Figure 1, the forward end of this body 22 is formed with a greatly reduced air exhaust nipple 24, through which the air generated by the fan 10 will be discharged. However, due to the inherent nature of the material forming the body 22 any return pressure through the pipe 20 into the head 16 will cause the closing of the discharge opening of said body so as to prevent the passage of the same into the fan chamber 5.

In order that air may be properly fed to the interior of the chamber, the same is formed in back of the fan 10 with a plurality of openings 25.

It will thus be seen that I have provided a highly novel, simple, and relatively inexpensive tire pump that is well adapted for all the purposes heretofore designated even though I have herein shown and described the invention as consisting of certain detail structural elements, it is nevertheless to be understood that minor changes may be made therein without affecting the spirit and scope of the appended claim.

Having thus described the invention, what I claim is:—

In a pump of the class described, an air chamber open at one end, the opposite end being reduced to provide a motor housing, said chamber being formed with a series of air inlet openings at the juncture of the chamber with the reduced portion thereof, a motor arranged within the housing, the drive shaft of the motor extending into the air chamber, a bearing arranged within the chamber for the shaft, a fan secured on the forward end of the shaft for generating air within the chamber, a conical shaped head open at its inner end and having a restricted discharge nipple formed at its smaller end, laterally extending flanges formed on the open ends of the chamber and head respectively, a substantially conical shaped body of rubber material open at its larger end, the open end of the rubber conical shaped body being flanged for disposition between the aforementioned flanges, fastening means extending through the flanges and the laterally disposed portion of the rubber body, said rubber body being disposed within the conical shaped head and being formed at its smaller end with a greatly restricted discharge nipple to permit the air generated in the chamber by the fan to enter the head and be discharged out through the nipple formed thereon but to prevent the return of the air into the chamber.

In testimony whereof I affix my signature.

ROBERT C. BUSHNELL.